Patented Nov. 19, 1940

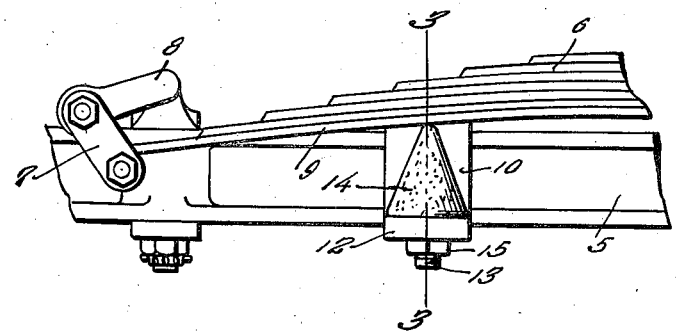
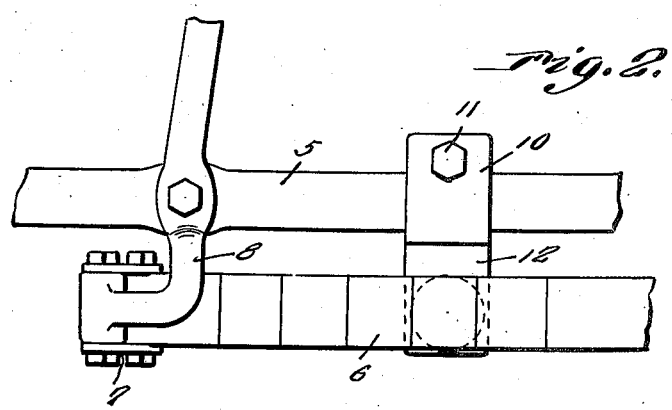
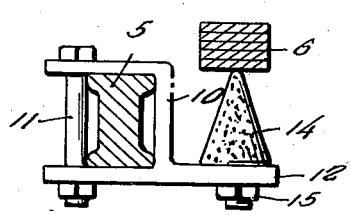

2,222,001

UNITED STATES PATENT OFFICE 2,222,001

SAFETY DEVICE FOR AUTOMOBILES

Albert L. Schulze, Nevada, Mo.

Application October 17, 1939, Serial No. 299,876

3 Claims. (Cl. 267—51)

This invention relates to safety devices for automobiles employing springs which parallel the axles and are connected thereto by having the main leaves of said springs pivoted on said axles by shackles and which have proven dangerous and cause of accidents due to the main leaves or shackles breaking, freeing the axles resulting in the automobiles turning suddenly to the right or left out of control of the driver. The present invention has for the primary object the provision of means for catching the springs should they break or become free of the axles and reestablish connections between said springs and axles which will prevent accidents from being caused as specified and which also acts to check spring movements when subject to severe road shocks and thus reduce spring breakage to a minimum.

With these and other objects in view, the invention consists in certain novel features of construction, combination and arrangement of parts to be hereinafter more fully described and claimed.

For a complete understanding of my invention, reference is to be had to the following description and accompanying drawing, in which:

Figure 1 is a fragmentary front elevation illustrating a portion of an automobile axle and spring with the axle equipped with a safety device constructed in accordance with my invention.

Figure 2 is a fragmentary top plan view illustrating the same.

Figure 3 is a sectional view taken on the line 3—3 of Figure 1.

Figure 4 is a fragmentary view, partly in section, showing the connection between a cushion element and a portion of the bracket of the present invention.

In the drawing I have elected to show the application of the present invention to the front axle of an automobile and it is to be understood that the present invention is also applicable to the rear axle construction of an automobile as well and further it is to be understood that in employing the present invention on an automobile each axle will be equipped with a pair of devices constructed in accordance with this invention, the devices being mounted on the axle so as to engage the spring adjacent its ends or where the spring mounts onto the axle by the spring shackles.

Referring in detail to the drawing, the numeral 5 indicates an axle of an automobile and 6 the spring of the automobile employed in conjunction with said axle 5. It is to be seen from the drawing that the spring 6 parallels the axle and is connected thereto by shackles 7, one of which is shown in the drawing. The spring besides paralleling the axle is disposed in advance of the axle, the spring perches 8 being so constructed as to position the spring with respect to the axle as specified.

By referring to the drawing it will be seen that the main leaf 9 of the spring 6 which is the lowermost leaf of the spring is pivotally connected to the shackles. This main leaf where pivoted onto the axle by the shackles is non-reinforced by the other leaves which go to make up the spring and consequently the ends of the main spring are the weakest portions of the main leaf and the most subject to breakage and when the main leaf breaks adjacent its free end will free that end of the spring from the axle allowing the spring to drop downwardly and the automobile to turn sharply in a direction from a straight course that may result in an accident. With the present invention applied to the axle so as to underlie the spring adjacent the ends of the main leaf will prevent the spring from dropping downwardly to any great extent when the main leaf breaks by coming to rest on the invention which reestablishes connection between the spring and the axle. Further, it will be seen that with the invention applied to the axle and underlying the spring as specified it will check spring flexing due to severe road shocks and thereby reduce to a minimum the chances of the spring breaking.

As before stated, a plurality of safety devices constructed in accordance with the present invention are employed on the axles of the automobile and each device consists of a substantially U-shaped bracket 10 to straddle the axle 5 as clearly shown in Figure 3. A tie bolt 11 extends through the ends of the bracket for retaining the latter on the axle. Extending from the bracket 10 is an arm 12 apertured to receive a screw threaded shank 13 and carried by said shank is a cushion head 14 preferably of conical shape. The head 14 is positioned directly under the spring of the vehicle by the arm 12 and the shank has threaded thereon a nut 15 for detachably mounting the head 14 on the arm. The distance between the head 14 and the arm 12 can be varied through the use of shims of different thicknesses one of which is shown by the character 16. The head being constructed of cushion material will act as a check for the movement of the spring in one direction owing to the compressible nature of the material of the head and should the spring become free of the axle it will be caught on the head which in combination with the bracket will reestablish connection between the spring and the axle.

When this device has been properly installed it also will act as a shock absorber, stabilizer, overload device, sway eliminator, and a road shock or shimmy eliminator. It is also to be understood that when this invention is adapted to late type models of automobiles, the springs of such models are provided with reinforcing elements to the main leaf and the present invention will only act as a support should the main leaf of the spring break as well as its reinforcement.

It is believed that the foregoing description, when taken in connection with the drawing will fully set forth the construction and advantages of my invention to those skilled in the art to which such a device relates, so that further detailed description will not be required.

Having thus described my invention, what I claim is:

1. In combination with an automobile axle and a spring paralleling said axle and having the lower leaf thereof pivoted on the axle at the ends thereof, brackets mounted on the axle and including portions extending horizontally from the axle under said spring, and cushion heads on said portions of the brackets and contacting the spring adjacent the ends of the main leaf to check spring movement and to support the spring when freed of the axle.

2. In a device of the character described, a substantially U-shaped bracket to straddle an axle, a tie bolt extending through the ends of the bracket, an arm on said bracket to extend under a spring, and a cushion head carried by said arm and normally spaced from the spring.

3. In a device of the character described, a substantially U-shaped bracket to straddle an axle, a tie bolt extending through the ends of the bracket, an arm on said bracket to extend under a spring, a stem detachably and adjustably connected to the arm, and a conical-shaped cushion head carried by said stem.

ALBERT L. SCHULZE.